United States Patent
Klein

(10) Patent No.: US 7,011,509 B2
(45) Date of Patent: Mar. 14, 2006

(54) COOLED CALIBRATING DEVICE FOR A PLASTIC EXTRUSION FACILITY

(75) Inventor: Helmut Klein, Ennigerloch (DE)

(73) Assignee: Veka AG, Sendenhorst (DE)

( * ) Notice: Subject to any disclaimer, the term of this patent is extended or adjusted under 35 U.S.C. 154(b) by 315 days.

(21) Appl. No.: 10/468,578

(22) PCT Filed: Feb. 21, 2002

(86) PCT No.: PCT/EP02/01818

§ 371 (c)(1),
(2), (4) Date: Sep. 16, 2003

(87) PCT Pub. No.: WO02/070228

PCT Pub. Date: Sep. 12, 2002

(65) Prior Publication Data
US 2004/0071804 A1    Apr. 15, 2004

(30) Foreign Application Priority Data
Mar. 1, 2001 (DE) .............................. 101 09 958

(51) Int. Cl.
*B29C 47/90*    (2006.01)

(52) U.S. Cl. ............................. 425/68; 425/70; 425/71; 425/73; 425/173; 425/326.1; 425/DIG. 60

(58) Field of Classification Search ................. 425/68, 425/70, 71, 73, 173, 326.1, DIG. 60
See application file for complete search history.

(56) References Cited

U.S. PATENT DOCUMENTS 3,169,272 A * 2/1965 Maxson ....................... 425/377

(Continued)

FOREIGN PATENT DOCUMENTS

DE    7620107    * 10/1976

(Continued)

OTHER PUBLICATIONS

J. Zierep: "Grundzuege der Stroemungslehre" 1987, G. Braun, Karlsruhe XP002207163, pps. 33-34.

(Continued)

*Primary Examiner*—Joseph S. Del Sole
(74) *Attorney, Agent, or Firm*—Milde & Hoffberg, LLP

(57) ABSTRACT

The invention relates to a cooled calibrating device for a plastic extrusion facility, comprising a housing (5) receiving a cooling liquid (2) and calibrating guides (6) through which a plastic profile (1) is passed, in addition to inlet and outlet holes (10, 23) having attached lines for the cooling liquid, wherein an area (21) free of liquid and filled with air remains above the level of the cooling liquid. An outlet hole (10) for the cooling liquid is arranged at the height of the cooling liquid level (20) in the calibrating device so that the cooling liquid can flow out without an additional pump. An outlet line (11) attached to the outlet hole extends vertically and ends in a cooling liquid reservoir (12) that is subjected to an external atmosphere, wherein a compact liquid column (24) is formed in the outlet line (11).

9 Claims, 3 Drawing Sheets

U.S. PATENT DOCUMENTS

| | | | | |
|---|---|---|---|---|
| 3,538,210 A | * | 11/1970 | Gatto | 264/519 |
| 3,558,753 A | * | 1/1971 | Edlin | 264/54 |
| 3,813,200 A | * | 5/1974 | Gergely | 425/140 |
| 3,893,465 A | * | 7/1975 | Cheatwood | 134/122 R |
| 5,480,295 A | * | 1/1996 | Greve | 425/71 |

FOREIGN PATENT DOCUMENTS

| | | |
|---|---|---|
| DE | 196 22 419 | 6/1996 |
| DE | 19707712 C1 * | 4/1998 |
| JP | 61-35928 * | 2/1986 |

OTHER PUBLICATIONS

H. J. Schlichting: "Spiel mit den Elementen-Wasser und Luft in Freihandexperimenten" Praxis der Naturwissenschaften-Physik, vol. 41, No. 2, 1992, pp.s. 1-7 XPOO2207162.

* cited by examiner

COOLED CALIBRATING DEVICE FOR A PLASTIC EXTRUSION FACILITY

BACKGROUND OF THE INVENTION

The invention relates to a calibration device for a plastic extrusion system comprising a housing to receive coolant through which a plastic profile may be transported and thus cooled by the coolant, calibration guides through which the plastic profile passes, inlet and exhaust openings with connected lines for the coolant where the level of the coolant lies above the highest point of the plastic profile to be calibrated and is so adjusted that a liquid-free, air-filled volume remains above the level of the coolant, and an air exhaust opening positioned above the level through which air may be extracted and a partial vacuum $$Pu = Pa - \Delta P$$

may be created in the liquid-free, air-filled volume above the coolant level with respect to ambient air pressure, whereby Pu is the partial vacuum prevailing in the calibration device, Pa is the ambient air pressure prevailing outside the calibration device, and $\Delta P$ is the difference between the two pressure values, each of which is measured in height units of a coolant column.

Plastic hollow profiles pressed out of an extruder are passed through cooling baths for calibration. A partial vacuum is required for calibration of the plastic hollow profile. With such so-called full baths, the profile is passed through an immersion bath of coolant located within the housing, mostly tap water. Circulation of the coolant requires a pump with relatively high output since air and water are passed through most calibration devices.

A procedure and a calibration device are known from DE 196 22 419 in which the convection flow is maintained to be a laminar as possible, whereby the critical Reynolds index is not to be exceeded.

On the one hand, it is difficult to prevent a turbulent flow with a profile passing through with constant input and extraction of the coolant. On the other hand, it is not always simple to separate the air from the water.

SUMMARY OF THE INVENTION

Thus, there remains the objective of reducing energy consumption in a calibration device for a plastic extrusion system by reducing the pump output without requiring the use of complicated control devices to prevent turbulent flow.

This objective is fulfilled with a calibration device of the type mentioned at the outset, in which the extraction opening for the coolant is positioned at the height of the coolant level in a wall of the housing of the calibration device so that the coolant may run out without additional pumps, and that a drain line connected to the extraction opening extends essentially vertically, ending below a level corresponding to $\Delta P$ in a coolant supply replacing atmospheric air, whereby a compact fluid column with a height h corresponding to $\Delta P$ is formed in the exhaust line.

As is known, the draining liquid may be trapped, or may run into a basin from which it is again withdrawn and passed to the calibration device housing through a cooled circuit.

The new device makes use of the siphon or barometer principle. Since partial vacuum with respect to the ambient pressure exists in an area above the coolant level, the fluid column within the exhaust line forms both a block and a receiving reservoir that is constantly refilled by the coolant passing through it. The coolant drains out from an area below the level of the coolant supply outside the calibration device. Thus, the partial vacuum in the housing is limited, and is held at a specified maximum level.

The drain line may, for example, end in an S-shaped siphon that includes a ventilation aperture in its upper curved area.

It is also possible, however, to allow the drain line to end in an open basin or open channel, whereby the aperture of the exhaust line is positioned below the coolant level of the basin or channel.

It is further advantageous if the drain line with its fluid column is a scale for the partial vacuum prevailing above the coolant level. One need not use a manometer if the drain line is provided with a viewing glass extending the entire length of the fluid column.

Finally, as already explained, the coolant supply exposed to the ambient atmosphere may be passed via a closed circuit through a heat exchanger and a pump section that ends below the coolant level in an opening in the housing.

Positioning a drain opening at the height of the coolant level further offers the option that several closeable drain openings may be positioned one above the other that may be used based on coolant needs and height.

A minimum of one of the drain openings for the coolant may also be equipped with a spillway adjustable in height, e.g., a gate adjustable in height.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
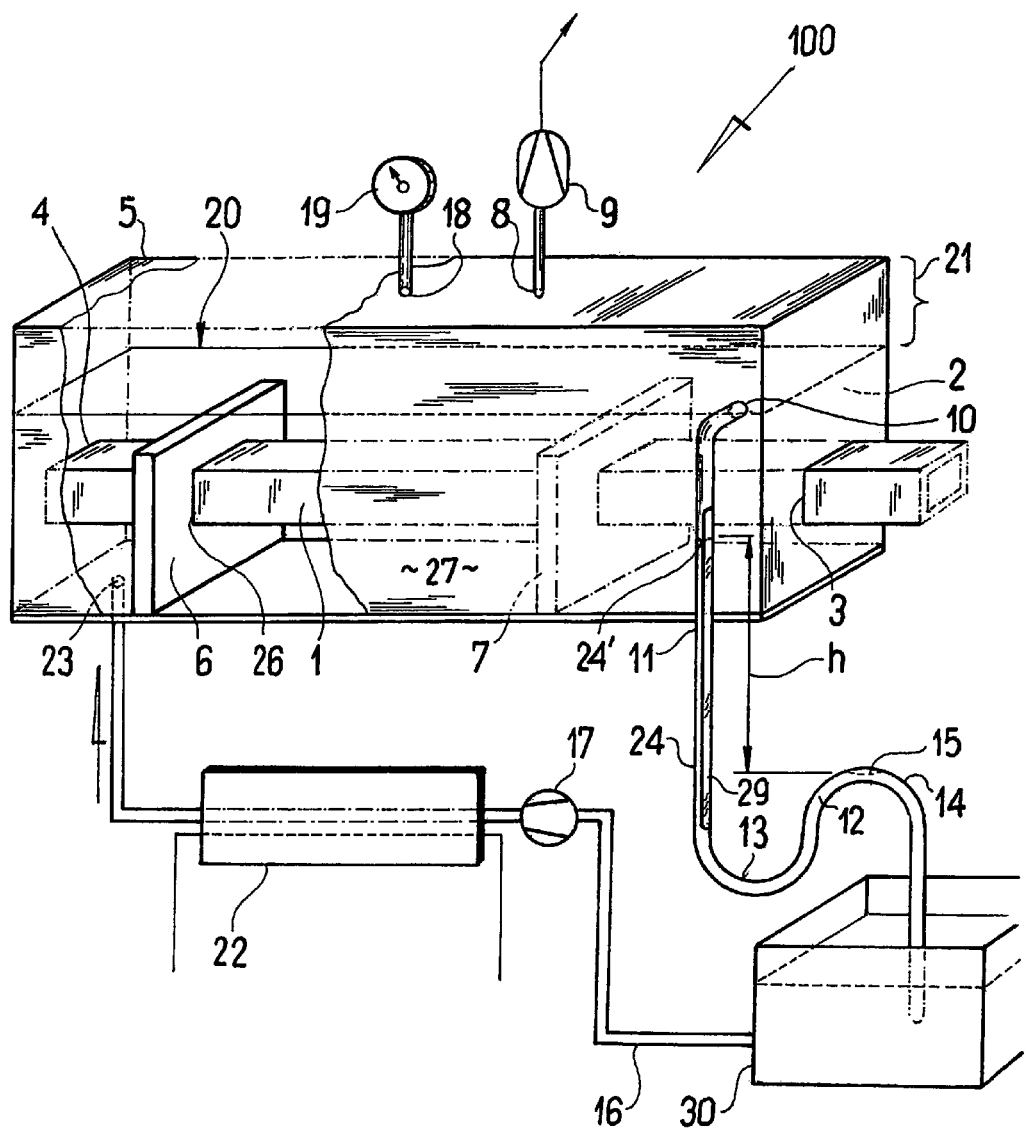
FIG. 1 is a schematic view of a calibration device for a plastic extrusion system with so-called wet cooling.

The preferred embodiment of the present invention will now be described with reference to FIGS. 1–3 of the drawings. Identical elements in the two figures are designated with the same reference numerals.

FIG. 1 shows a calibration device 100 that serves for so-called wet calibration of an endlessly extruded, constantly transported hollow plastic profile 1. The extruded hollow plastic profile 1, which is also passed through a dry calibration section after extrusion, is passed between a profile inlet 3 and a profile outlet 4 via a housing 5 filled with a coolant 2, is cooled by convection flow, and is calibrated by means of conventional calibration guides 6 and calibration openings 26.

The coolant level 20 lies above the apex of the plastic profile 1 to be calibrated, and is so adjusted that a liquid-free, air-filled volume 21 remains above the level 20 of the coolant 2. The pressure in the volume 21 may be measured by means of a manometer 10 via a manometer opening 18 in the cover of the housing 5. This pressure is below that of the ambient atmosphere. The partial vacuum is held upright by means of a pump opening 8 with connected line and air pump 9. The partial vacuum Pu has a pressure differential $\Delta P = Pa - Pu$ with respect to the partial vacuum Pa. The pressure differential ΔP may be measured, in the "water column," whereby 1 cm of water height or coolant height corresponds to 1 mbar. The pressure must be maintained relatively constant.

The various pressure differentials may be observed with a view glass 29 that is incorporated into the drain line 11 instead of using a manometer 10. In principle, a manometer is not required at all.

A drain opening 10 for the coolant 2 is located in the wall 27 of the housing 5 at the level of the coolant. The coolant 2 may drain into the drain line 11 connected to the drain opening 10 without an additional pump. The drain line 11 extends essentially vertically, and ends below the level corresponding to ΔP in a coolant supply tank 12 exposed to the atmosphere in the tubular line bend, whereby a compact fluid column 24 with the level 24' is formed whose height h corresponds to the pressure differential ΔP based on the barometer principle.

In this embodiment, the drain line 11 ends in an S-shaped bent siphon 13 that is bent upward from the lowest position and includes a ventilation opening 15 in its upper arch 14 exposed to the atmosphere from which no fluid exits.

Figure 2:
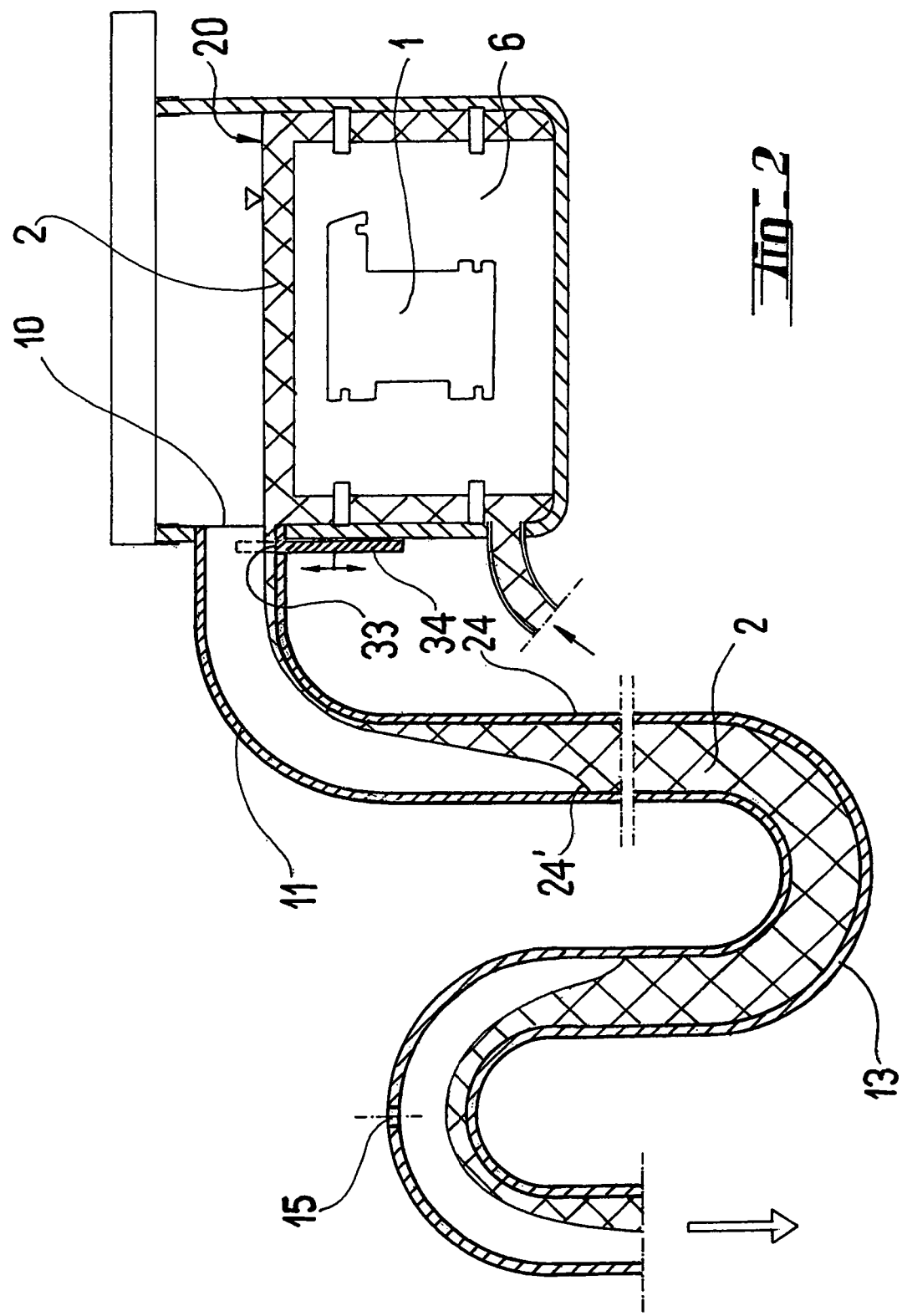
FIG. 2 is an altered view of the device in FIG. 1 with some detail.

In a slightly enlarged view, FIG. 2 shows that the drain line 11 begins at the drain opening 10. The coolant 2 designated with cross-hatching flows in and forms a block against atmospheric pressure in a siphon 13. The aforementioned fluid column 24 is formed by proper positioning of the ventilation opening 15. The fluid flows out the end of the S-shaped bent siphon 13.

Figure 3:
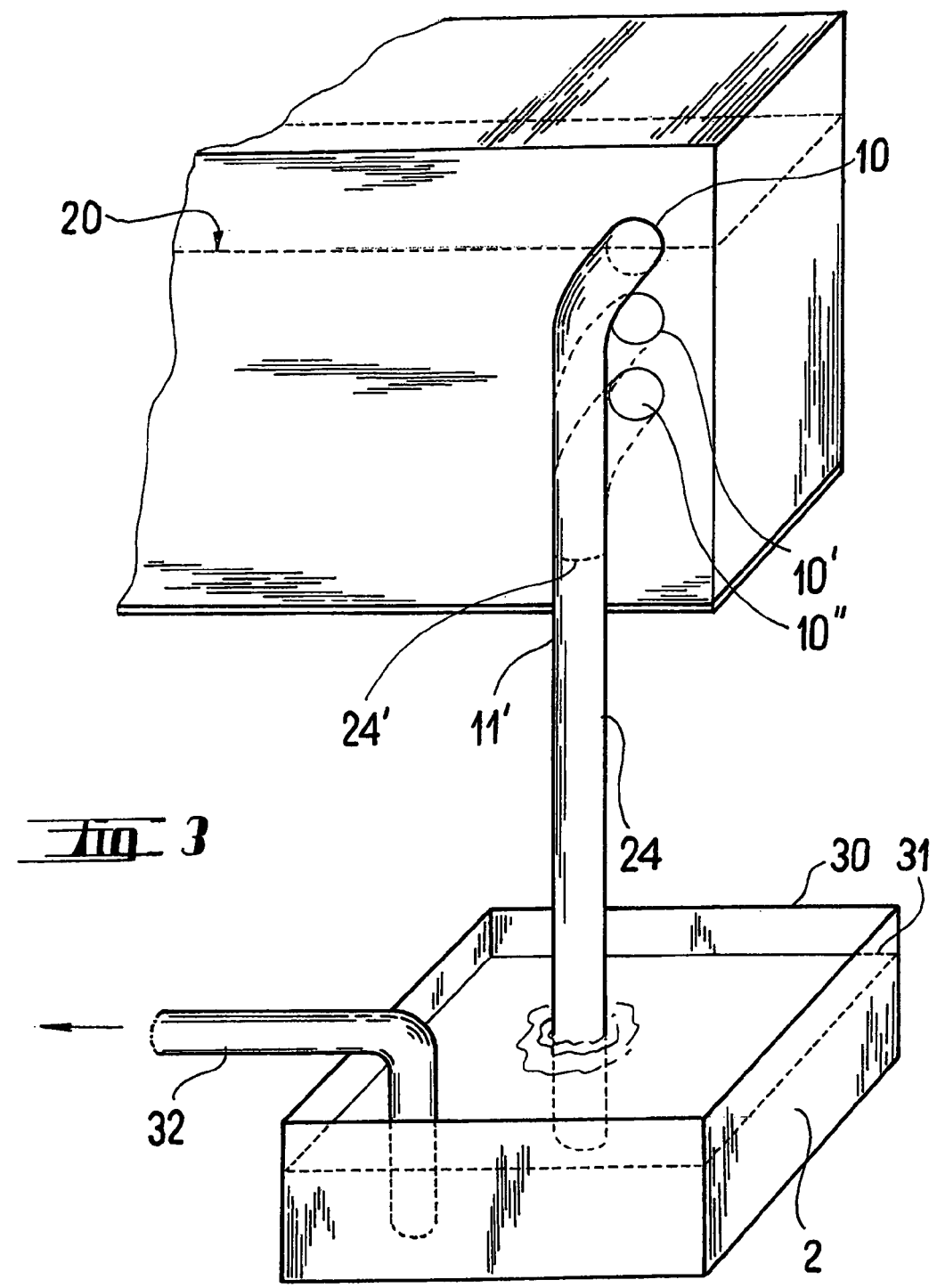
FIG. 3 is a second embodiment of the invention in which the drain aperture ends in a basin.

Water drainage from the calibration device may also be so configured that the drain line 11', as shown in FIG. 3, does not end as a siphon, but rather in an open basin 30 that is filled with coolant 2 to å level 31. The barometer effect also comes into play here. A coolant column 24 with a level 24' is present in the drain line 11.

The coolant 2 which may be taken from the outlet of the siphon or via an outlet line 32 of a basin 30 is re-circulated via a return pump 17 and a line 16. The warmed coolant is cooled via an external cooler 22, and is again forced into the housing 5 via the inlet 23 in the housing.

Since a basically single-phase system is involved in the coolant (tap water) to be transported, pump output may be considerably lower than in a two-phase transport in which larger portions of air are also transported.

As one may see, the coolant outlet, i.e., the drain opening 10, may be mounted either on this side or in the front side of the housing 5. The coolant in this embodiment example is guided in the opposite direction as the hollow plastic profile 1, but may also be guided in the same direction.

One may further see from FIG. 3 that several drain openings 10, 10', 10'' may be positioned one above the other, whereby closeable drain openings for the coolant are involved. Various heights may be set depending on the required coolant level.

It is also possible (see FIG. 2) to equip a drain opening 10 for the coolant with an adjustable-height overflow spillway that is adjustable by means of a gate that is adjustable in height.

The vertical length of the drain line should be set at a pressure differential of ΔP of from 10 to 80 mbar so that a predominant coolant column of from 10 to 80 cm is formed, i.e., the drain line should be about 80 cm long if extreme values of 80 mbar=ΔP are anticipated.

Overall, the new calibration device with pump-less cooling water drainage has a decided advantage, particularly regarding operating energy consumption in comparison with the conventional calibration devices provided with air and water pumps.

There has thus been shown and described a novel cooling calibrating device for a plastic extrusion system which fulfills all the objects and advantages sought therefor.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. In a calibration device for a plastic extrusion system comprising:
    a. a housing to receive the coolant, through which a plastic profile may be transported and thereby cooled by the coolant,
    b. calibration guides in the housing through which the plastic profile passes,
    c. inlet and drainage openings in the housing with connected lines for the coolant,
    d. wherein the coolant level in the housing lies above the apex of the plastic profile to be calibrated and is so adjusted that a liquid-free, air-filled volume remains above the coolant level, and
    e. an air extraction aperture in the housing above the coolant level through which air may be extracted and a partial vacuum of $$Pu=Pa-\Delta P$$

may be created in the liquid-free, air-filled volume above the coolant level with respect to ambient air pressure, whereby Pu is the partial vacuum prevailing in the calibration device, Pa is the ambient air pressure prevailing outside the calibration device, and ΔP is the difference between the two pressure values, each of which is measured in height units of a coolant column, the improvement wherein
    f. the drain opening for the coolant is positioned in a wall of the housing at the coolant level so that the coolant may drain without an additional pump,
    g. and that a drain line connected to the drain opening extends essentially vertically and ends below a level corresponding to ΔP into a coolant supply tank exposed to the ambient atmosphere, whereby a compact fluid column with a height h corresponding to ΔP is formed.

2. Calibration device as in claim 1, wherein the drain line ends in an S-shaped bent siphon that includes a ventilation opening in its upper curve.

3. Calibration device as in claim 1, wherein the drain line ends in an open basin or an open channel, whereby the opening of the drain line is positioned below the coolant level of the basin or the channel.

4. Calibration device as in claim 1, wherein the drain line is provided with an observation glass for the entire extent of the fluid column.

5. Calibration device as in claim 1, wherein the coolant supply tank exposed to the ambient atmosphere is connected to the coolant inlet of the housing via a closed circuit through a heat exchanger and a pump, said coolant inlet being disposed below the coolant level within the calibration device.

6. Calibration device as in claim 1, wherein a plurality of closeable drain openings, each connected to the drain line, are positioned one above the other in the housing wall.

7. Calibration device as in claim 1, wherein at least one of the drain openings for the coolant is provided with an overflow spillway adjustable in height.

8. Calibration device as in claim 7, wherein at least one of the drain openings is provided with a gate adjustable in height.

9. Calibration device as in claim 1, wherein the vertical length of the drain line is at least 80 cm.

* * * * *